(12) United States Patent
Ubaru et al.

(10) Patent No.: US 11,500,963 B2
(45) Date of Patent: Nov. 15, 2022

(54) FAST PCA OF EVOLVING DATA USING ANALOG CROSSBAR ARRAY

(71) Applicants: INTERNATIONAL BUSINESS MACHINES CORPORATION, Armonk, NY (US); Ramot at Tel Aviv University Ltd., Tel-Aviv (IL)

(72) Inventors: Shashanka Ubaru, Ossining, NY (US); Vasileios Kalantzis, White Plains, NY (US); Lior Horesh, North Salem, NY (US); Mark S. Squillante, Greenwich, CT (US); Haim Avron, Tel Aviv (IL)

(73) Assignees: INTERNATIONAL BUSINESS MACHINES CORPORATION, Armonk, NY (US); RAMOT AT TEL AVIV UNIVERSITY LTD., Tel-Aviv (IL)

( * ) Notice: Subject to any disclaimer, the term of this patent is extended or adjusted under 35 U.S.C. 154(b) by 274 days.

(21) Appl. No.: 17/060,883

(22) Filed: Oct. 1, 2020

(65) Prior Publication Data

US 2022/0107991 A1    Apr. 7, 2022

(51) Int. Cl.
*G06F 17/16*    (2006.01)
*G06G 7/16*    (2006.01)
*G06F 7/57*    (2006.01)

(52) U.S. Cl.
CPC ............... *G06F 17/16* (2013.01); *G06F 7/57* (2013.01); *G06G 7/16* (2013.01)

(58) Field of Classification Search
CPC ..... G06G 7/16–163; G06G 7/22; G06F 17/16; G06F 7/5443
See application file for complete search history.

(56) References Cited

U.S. PATENT DOCUMENTS

| | | | |
|---|---|---|---|
| 11,216,184 B2* | 1/2022 | Choi | .................. G06F 11/1048 |
| 2018/0198687 A1 | 7/2018 | Rao et al. | |
| 2019/0098039 A1 | 3/2019 | Gates et al. | |
| 2019/0269372 A1 | 9/2019 | Gupta et al. | |

OTHER PUBLICATIONS

Choi et al., "Experimental Demonstration of Feature Extraction and Dimensionality Reduction Using Memristor Networks", NANO Letters, Apr. 2017, pp. 3113-3118.

Liu et al., "A Memristor-Based Optimization Framework for AI Applications", arXiv:1710.08882v1 [cs ET] Oct. 18, 2017, pp. 1-28.

(Continued)

*Primary Examiner* — Matthew D Sandifer
(74) *Attorney, Agent, or Firm* — Tutunjian & Bitetto, P.C.; Stosch Sabo

(57) ABSTRACT

A method of performing Principal Component Analysis is provided. The method includes receiving, by a computing device, evolving data for processing/visualization. The method further includes, by the computing device, a dimensionality for reducing of the evolving data using the PCA, wherein the PCA is performed on analog crossbar hardware. The method also includes using, by the computing device, the evolving data for visualization having the dimensionality thereof reduced by the principal component analysis for a further application.

23 Claims, 9 Drawing Sheets

(56) References Cited

OTHER PUBLICATIONS

Mor-Yosef et al., "Sketching For Principal Component Regression", Siam J. Matrix Anal. Appl., Apr. 2019, vol. 40, No. 2, pp. 454-485.
Xiao et al., "Analog Architectures for Neural Network Acceleration Based on Non-Volatile Memory", Appl. Phys Rev 7, 031301 (2020); https://doi.org/10.1063/1.5143815, Jul. 2020, pp. 1-35.
Yakopcic et al., "Extremely Parallel Memristor Crossbar Architecture for Convolutional Neural Network Implementation", IEEE 2017, May 2017, pp. 1696-1703.
Yu et al., "Distributed In-Memory Computing on Binary Memristor-Crossbar for Machine Learning", Springer International Publishing AG 2017 Advances in Memristors, Memristive Devices and Systems, Studies in Computational Intelligence 701, 2017, pp. 274-304.
Mell et al. "The NIST Definition of Cloud Computing", NIST Special Publication 800-145, 2011, 7 pages.

\* cited by examiner

| Methods | Cost |
|---|---|
| Data in-memory | |
| Digital full decomposition | $O(n^3)$ |
| Digital randomized power method (sketching) | $O(nnz(A)qk + nk^2)$ |
| Analog sketching | $O(qk + nk^2)$ |
| Data in-memory | |
| Digital update and sketch | $O(nnz(A)qk + nk^2 + np^2)$ |
| Analog update and sketch | $O(kq + p^2 + nk^2)$ |

FIG. 6

| Methods | Cost |
|---|---|
| Digital full decomposition | $O(nd^2)$ |
| Digital streaming (sketching) | $O(nsd) + O(ds^2)$ |
| Analog sketching | $O(ds^2)$ |

FIG. 7

FAST PCA OF EVOLVING DATA USING ANALOG CROSSBAR ARRAY

BACKGROUND

The present invention generally relates to information processing, and more particularly to fast Principle Component Analysis (PCA) of evolving data using an analog crossbar array.

PCA is a standard technique for visualizing high dimensional data and for data preprocessing. PCA reduces the dimensionality (the number of variables) of a data set by maintaining as much variance as possible. The first principal component can be defined as a direction that maximizes the variance of the projected data. The i-th principal component can be taken as a direction orthogonal to the first i-1 principal components that maximizes the variance of the projected data.

Several important, high-profile applications have a PCA-based algorithm as a core computational component. Several examples come from high profile areas such as, for example, population genetics, cosmology, climate science, biosciences, and so forth.

In PCA applications, the data can be static, evolving (changing over time), or even streaming. Applications with static data involve, for example, Eigengene analysis, mass-spectrometry imaging, and object recognition. Evolving data is encountered, for example, in structure from motion, recommender systems, and climate data.

It can be shown that the principal components are eigenvectors of the data's covariance matrix. A covariance matrix is a square matrix giving the covariance between each pair of elements of a given random vector. In the matrix diagonal there are variances, i.e., the covariance of each element with itself. Thus, the principal components are often computed by eigen decomposition of the data covariance matrix or Singular Value Decomposition (SVD) of the data matrix.

However, SVD for large covariance matrices is computationally expensive. Moreover, SVD is prohibitive for evolving data matrices that change over time. Hence, there is a need for fast PCA techniques for evolving data.

SUMMARY

According to aspects of the present invention, a method of performing Principal Component Analysis is provided. The method includes receiving, by a computing device, the evolving data for visualization. The method further includes performing the PCA on an analog crossbar hardware by loading the evolving data onto the analog crossbar hardware, and using matrix vector products based on the analog crossbar hardware to reduce the evolving data to obtain reduced dimensionality evolving data. The method also includes using the reduced dimensionality evolving data for a further application.

In this way, evolving data, which is conventionally not suitable for PCA, can be readily subjected to PCA using the method of present invention. Moreover, data whose dimensionality is reduced by PCA can be used for a further application.

Further to the method, the further application can be selected from the group consisting of at least one of population genetics, cosmology, climate science, and bioscience.

Hence, the further application is selectable for a myriad of various applications which can benefit through the use of PCA.

Further to the method, the reducing step can include random sketching using the analog crossbar hardware. Sketching is popular technique used to compress a very large data matrix using randomization with provable theoretical guarantees for the approximation obtained. The method computes the sketch of the input data using a random Gaussian (or other) sketching matrix of a much smaller dimension. The sketched matrix (of small size) can then be used to obtain the principal components (PCs) of the input matrix using say SVD. It can be shown that these approximate PCs are within $(1\pm\varepsilon)$ multiplicative factor of the exact PCs with respect to spectral and Frobenius norms.

Further to the method, the reducing step can include forming at least one sketched matrix in an analog space. The sketching operation involves computing a set of matrix-vector products, and can be achieved in O (1) time using the analog crossbar hardware. This significantly reduces the PCA computation cost. The analog crossbar hardware also enables updating the input matrix with rank-1 updates in just O (1) time using the outer products. The rapid updating and sketching using the analog crossbar hardware, therefore, enables us to compute the PCA of evolving matrices quickly and possibly in real-time.

According to other aspects of the present invention, a computer program product is provided for performing Principal Component Analysis (PCA). The computer program product includes a non-transitory computer readable storage medium having program instructions embodied therewith. The program instructions are executable by a computer to cause the computer to perform a method. The method includes receiving, by a computing device, the evolving data for visualization. The method includes performing the PCA on an analog crossbar hardware by loading the data onto the analog crossbar hardware, and using matrix vector products based on the analog crossbar hardware to reduce the evolving data to obtain reduced dimensionality evolving data. The method further includes using the reduced dimensionality evolving data for a further application According to yet other aspects of the present invention, a system is provided for performing Principal Component Analysis (PCA). The system includes a Resistive Processing Unit (RPU) crossbar array configured to store a matrix of evolving data for visualization. The system further includes a processor device for performing the PCA on the RPU crossbar array by loading the data onto the RPU crossbar array, and using matrix vector products based on the RPU crossbar array to reduce the evolving data to obtain reduced dimensionality evolving data. The processor device uses the reduced dimensionality evolving data for a further application.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 is a table showing computational complexities of various evolving data based methods including randomized PCA in accordance with the present invention and shows the advantages of the present invention over existing state of the art methods;

FIG. 7 is a table showing computational complexities of various streaming data based methods including analog streaming in accordance with the present invention;

DETAILED DESCRIPTION

Embodiments of the present invention are directed to fast Principle Component Analysis (PCA) of evolving data using an analog crossbar array.

Embodiments of the present invention use randomized sketching and analog crossbar hardware to perform a multitude of types of PCA applications.

Embodiments of the present invention involve a first stage which, in turn, involves sketching, that is random RPU conductance sampling. Embodiments of the present invention also involve a second stage which, in turn, involves projection of the sketched points. From these two stages, the top k principal components of input data can be obtained.

Figure 1:
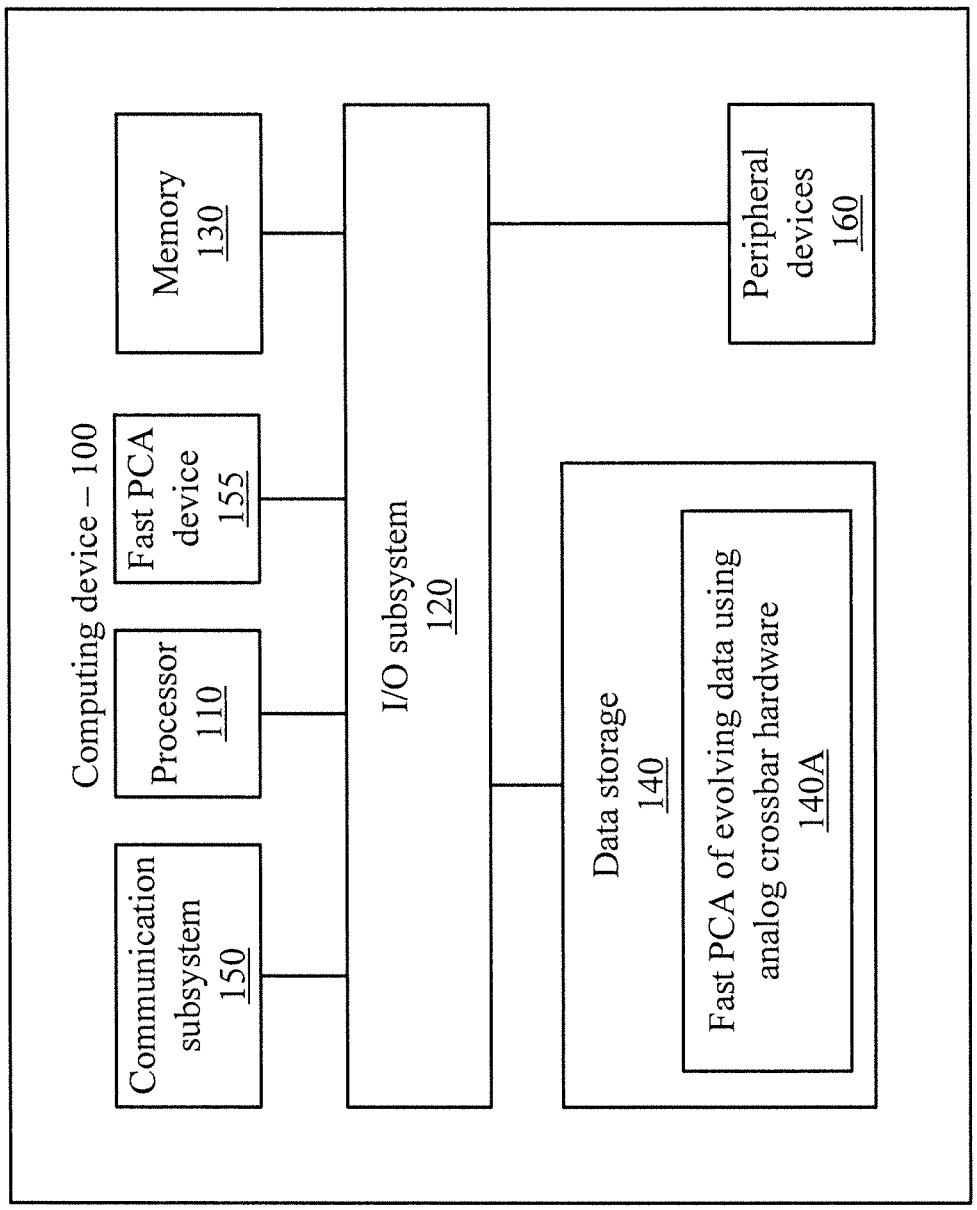
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform fast PCA of evolving (changing) data using analog crossbar hardware.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, a fast PCA device 155, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for fast PCA of evolving (changing) data using analog crossbar hardware. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

Figure 2:
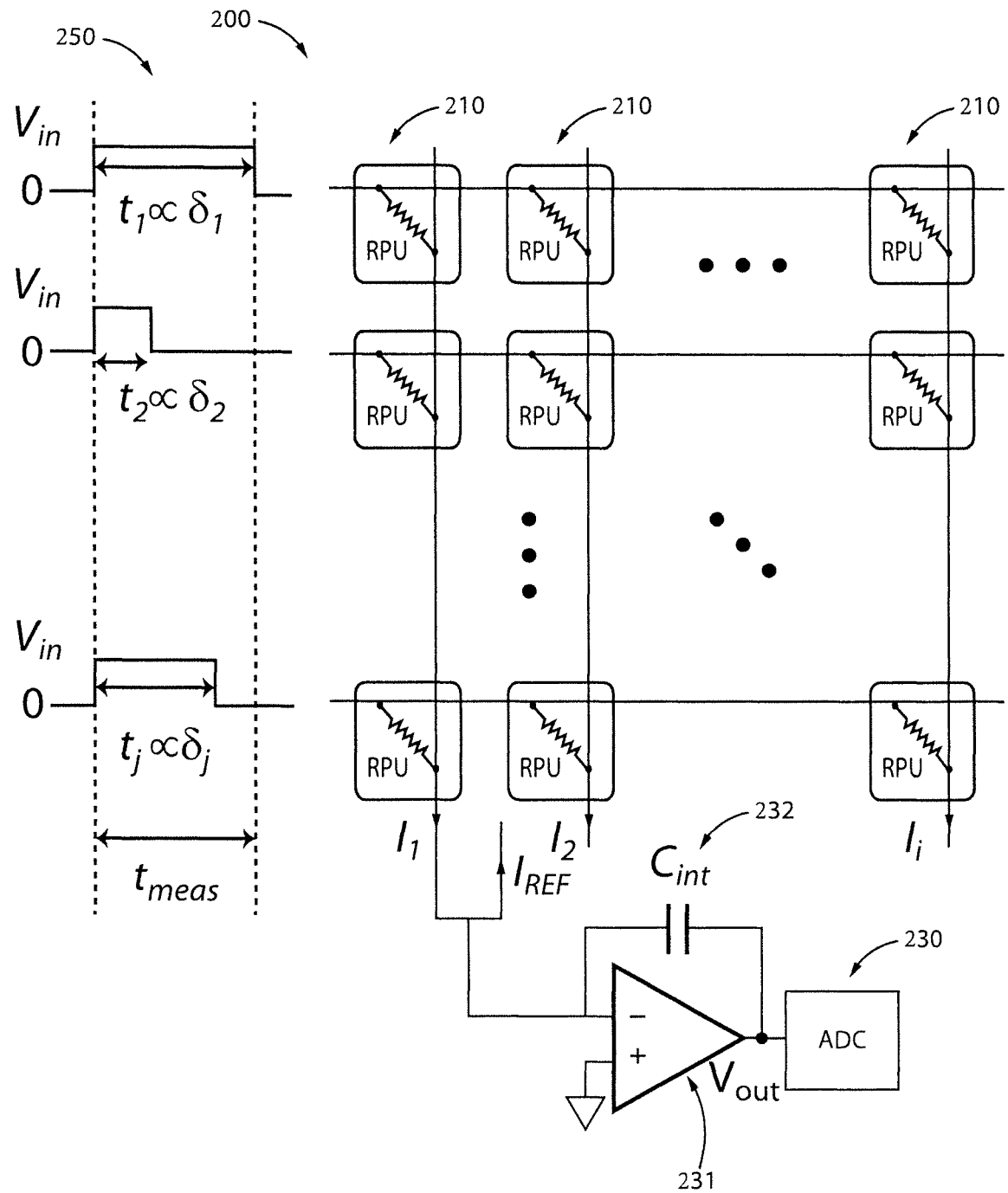
FIG. 2 is a block diagram showing an exemplary RPU-based analog architecture and corresponding signals, in accordance with an embodiment of the present invention.
Figure 3:
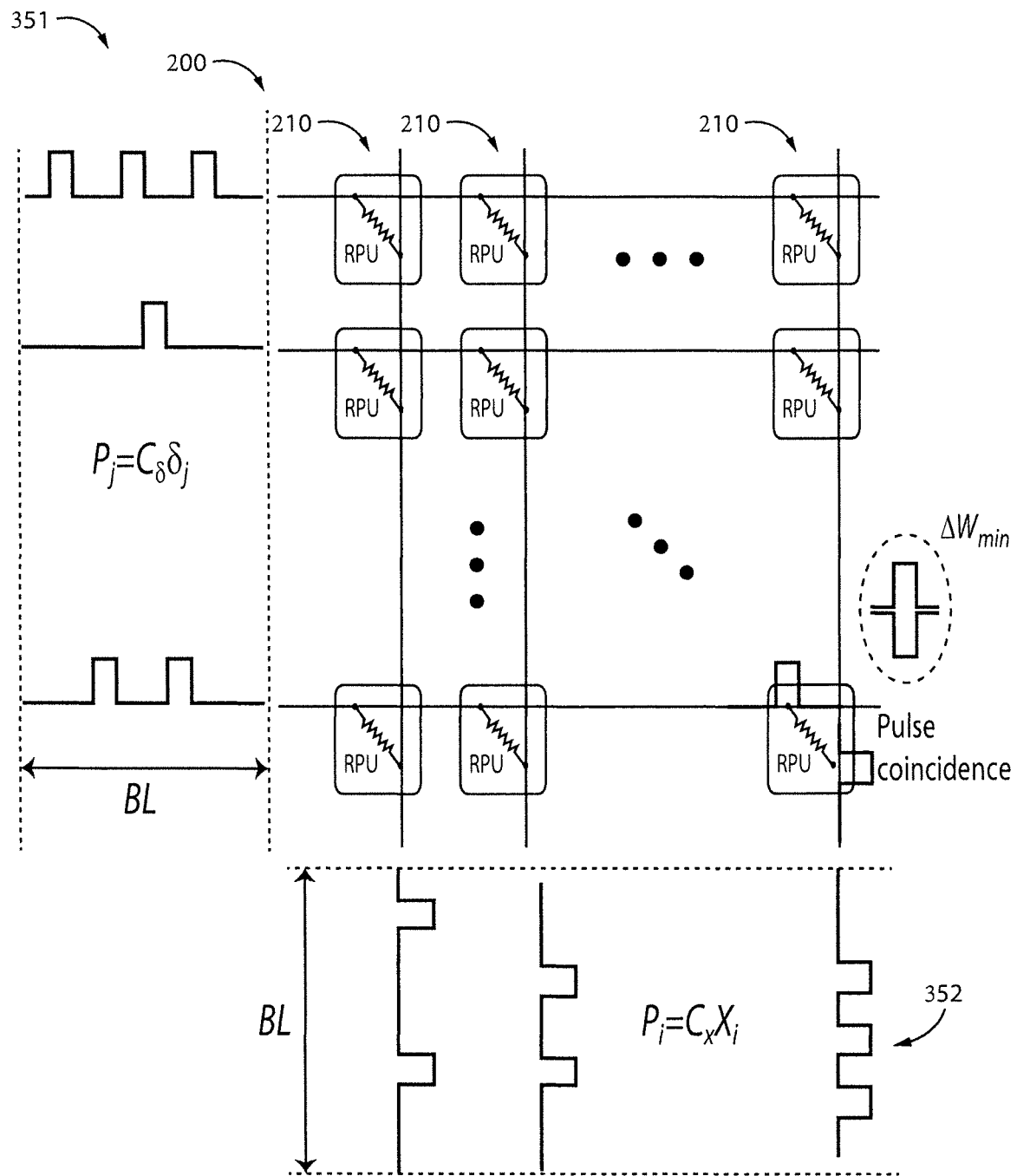
FIG. 3 is a block diagram showing a portion of the exemplary RPU-based analog architecture of FIG. 2 and corresponding sets of training phase signals and, in accordance with an embodiment of the present invention.

The fast PCA device 155 includes analog crossbar hardware as shown in further detail herein. For example, exemplary analog crossbar hardware is shown in FIGS. 2 and 3 described in further detail herein.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 8-9). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention In relation to FIGS. 2 and 3, pulsing schemes are shown that enable a stochastic update rule for a RPU according to embodiments of the present invention. The voltage pulses with positive and negative amplitudes are sent from corresponding rows and columns, respectively. Translated stochastic numbers are represented by a whole population of these pulses. In order for a two-terminal RPU device to distinguish pulse coincidence events at a cross-point, its conductance value should not change significantly when a single pulse V in/2 is applied to a device from a row or a column. However, when two pulses coincide and the RPU device sees the full voltage (Vin) the conductance should change by nonzero amount $\Delta g_{min}$. The parameter $\Delta g_{min}$ is proportional to $\Delta w_{min}$ through the amplification factor defined by neuron circuitry. To enable both up and down changes in conductance the polarity of the pulses can be switched during the update cycle.

FIG. 2 is a block diagram showing an exemplary RPU-based analog architecture 200 and corresponding test phase signals 250, in accordance with an embodiment of the present invention.

The architecture includes an array of RPU cells 210 having inputs connected to neurons $\delta_1$ through $\delta_j$ row-wise and to an integrator 220 column-wise, where there are total of j rows and i columns. The integrator 220 is formed from an operation amplifier 221 having one input connected to one end of a capacitor 222, an output connected to the other end of the capacitor 222, and the other input connected to a reference potential (e.g., ground). Each column provides a digital voltage (pulses) from a neuron while each row provides a respective analog current to be integrated, from $I_1$ through $I_i$, for row 1 through row i, respectively. The output of the integrator 220 is connected to an Analog-to-Digital-Converter (ADC) 230 for conversion to a digital value.

Row 1 receives a pulse of $t_1 \, \alpha \, \delta_1$, row 2 receives a pulse of $t_2 \, \alpha \, \delta_2$, and so on up to row j receives a pulse of $t_j \, \alpha \, \delta_j$.

Further regarding the forward pass signals (pulses) 250, they are mostly constant amplitude pulses, that the polarity is determined by the sign of the input and duration is determined by the absolute value of the input (i.e. time encoded). In other embodiments, amplitude-encoding can be performed. These pulses are often assumed to have a maximum duration of 100 ns in general.

Each row provides a respective current that is summed with a reference current as an input to the integrator 220.

The following definitions apply: A denotes a matrix; x denotes a vector (can be an Eigenvector); and $A^T$ denotes the transpose of the matrix A. Matrix vector multiplication for Ax, $A^T$x, xA, $AxA^T$ are all O(1). For complex matrices, two cells realize the real and imaginary parts separately which makes A* and A† readily available.

FIG. 3 is a block diagram showing a portion of the exemplary RPU-based analog architecture 200 of FIG. 2 and corresponding sets of signals 351 and 352, in accordance with an embodiment of the present invention.

$P_j = C_\delta \delta_j$, where $P_j$ denotes a pulse amplitude at the j-th column, $C_\delta$ denotes a gain factor for an input neuron, and $\delta_j$ denotes a j-th input neuron.

$P_i = C_x x_i$, where $P_i$ denotes a pulse amplitude at the i-th row, $C_x$ denotes a gain factor for an Eigenvalue, and $x_i$ denotes an i-th vector.

BL denotes the length of the stochastic bitstreams having stochastic pulses.

Further regarding the signals (pulses) 351, the stochastic update scheme essentially is a method to update the entire crossbar array at once. First, one should assume that following are correct for each cross point element:

The conductance value will change if the absolute value of the programming voltage is greater than a threshold.

Example: $V_{prog} > 2V \, \Delta G = 1 \mu S$ $-2V < V_{prog} < 2V, \Delta G = 0$ $V_{prog} < -2V, \Delta G = -1 \mu S$ In the crossbars such as those shown in FIGS. 2 and 3, $V_{prog}$ is essentially the voltage difference across each element. Thus, for example for the device $G_{i,j}$ if 1V is applied from the row i and −1V from column j then the device will have 2V across it and its conductance goes up. Now, if is presumed that from rows one can either force 1V or GND while for columns using only GND or −1V 1V, it can be seen that only for the 1V, −1V condition there is any conductance change (hence the name coincidence detection). It can be seen why every element in the array can be modulated at the same time since when the voltages from the rows and columns are set, the voltage difference instantly appears across each element.

However, rank update cannot be performed using this method. Indeed, the ones that can be made are rank-1 updates: which can be written as x×δ (outer product), corresponding to a matrix with entries $$x_1\delta_1 \quad x_1\delta_2$$
$$x_2\delta_1 \quad x_2\delta_2$$

for the 2×2 case. Furthermore, it is not desirable to compute these elements by multiplying either. Then, first, any number (x, δ) is translated to a stochastic bit stream such that probability of having a "HIGH" bit is proportional to the value itself. For example, following the method above, if $x_1$ is 2 and say the maximum x would be 5 then for 40% 1V is provided whereas for the remaining 60% GND is forced, and so on. Then, the thresholding behavior mentioned above essentially means an AND operation (coincidence of both pulses is necessary for any change to occur). Co-occurrence of two probabilistic events has the probability of their individual probabilities compounded, which provides the multiplication part for the x×δ. Furthermore, this does not need to be added to the matrix, since the conductance values are already modified with this method. As a result, rank-one updates can be performed in parallel and without even explicitly computing any multiplications or additions.

Further regarding the signals (pulses) 352, the input that is translated to stochastic bit stream for 251 is −x whereas that for 252 is λx since you want to perform the rank-one update−xλ$x^T$. For DNNs there is often a learning rate η, which is not the case here (or η=1).

If the matrix that is trained on is analog as is the case here, then the update of the matrix via outer products have O(1) computational complexity.

A description will now be given regarding a hybrid randomized PCA algorithm, in accordance with an embodiment of the present invention.

Input: The input data $A \in \mathbb{R}^{n \times d}$, and updates to the input data $W \in \mathbb{R}^{n \times p}$ (if any).
Output: The top k principal components $U_k$.
Stage A: Sketching (Random RPU Conductance Sampling)
1. Load matrix A to the analog hardware, and generate a random matrix $S \in \mathbb{R}^{n \times 1}$, l=o(k).
1a. If we have updates W, Update $A \rightarrow A+WW^T$ using the fast rank-1 update approach in the analog crossbar hardware.
2. Compute $Y=(AA^T)^q AS$ using the fast matrix-vectors with the analog crossbar hardware.
3. Compute the orthogonal basis Q=orth(Y).
Stage B: Projection (of Sketched Points)
4. Compute small matrix $B=Q^T A$ using the analog crossbar hardware.
5. Compute the SVD of small matrix B as $[U_k, \Sigma_k, V_k]$=svd(B,k).
6. The top k principal components are given by $U_k = Q U_k$.

It is to be appreciated that steps 1a, 2 and 4 involve analog computation.

Figure 4:
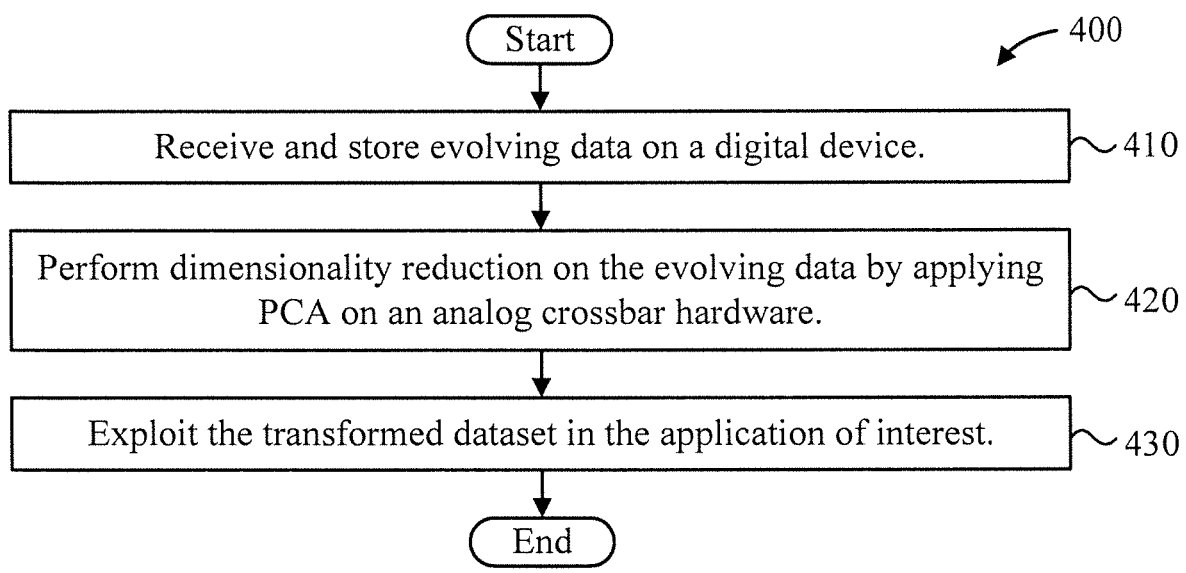
FIG. 4 shows an exemplary method for fast PCA of evolving data using analog crossbar hardware, in accordance with an embodiment of the present invention.
Figure 5:
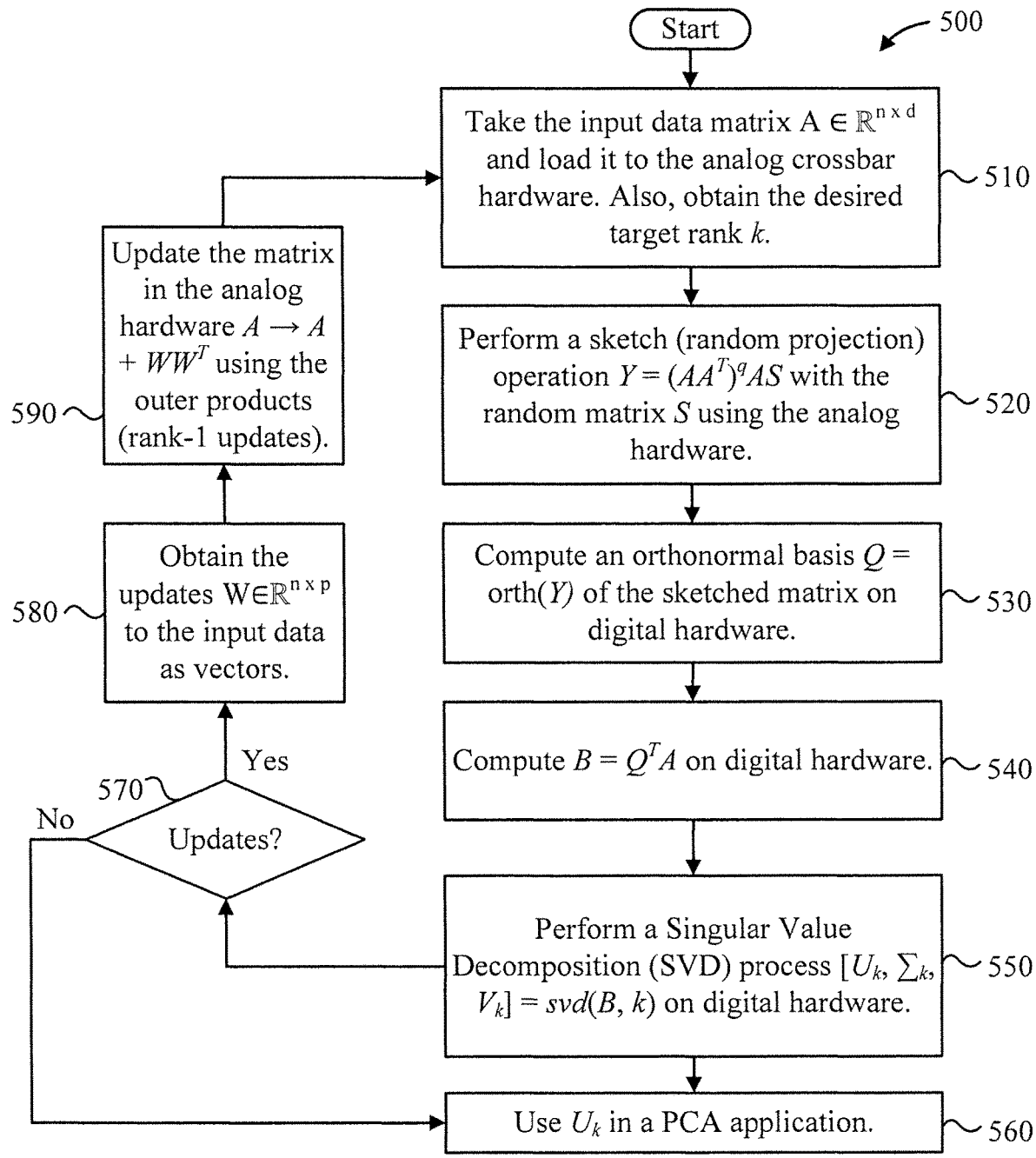
FIG. 5 shows another exemplary method for fast PCA of evolving data using analog crossbar hardware, in accordance with an embodiment of the present invention.

FIGS. 4 and 5 hereinafter describe various methods for past PCA of evolving data using analog crossbar hardware. FIG. 4 can be considered an overview of the more detailed method of FIG. 5.

FIG. 4 is an exemplary method 400 for fast PCA of evolving data using analog crossbar hardware, in accordance with an embodiment of the present invention.

At block 410, receive and store evolving data on a digital device.

At block 420, perform dimensionality reduction on the evolving data by applying PCA on an analog crossbar hardware.

At block 430, exploit the transformed dataset in the application of interest.

FIG. 5 shows another exemplary method 500 for fast PCA of evolving data using analog crossbar hardware, in accordance with an embodiment of the present invention.

At block 510, take the input data matrix $A \in \mathbb{R}^{n \times d}$ and load it to the analog crossbar hardware. Also, obtain the desired target rank k.

At block 520, perform a sketch (random projection) operation $Y=(AA^T)^q AS$ with the random matrix S using the analog hardware.

At block 530, compute an orthonormal basis Q=orth(Y) of the sketched matrix on digital hardware. Such digital hardware can include, for example, a processor device and a memory device.

At block 540, Compute $B=Q^T A$ on digital hardware.

At block 550, perform a Singular Value Decomposition (SVD) process $[U_k, \Sigma_k V_k]$=svd(B,k) on digital hardware.

At block 560, use $U_k$ in a PCA application.

At block 570, determine whether an update is to be applied (whether the matrix has evolved/changed). If so, then proceed to block 580. Otherwise, proceed to block 560.

At block 580, obtain the updates $W \in \mathbb{R}^{n \times p}$ to the input data as vectors.

At block 590, update the matrix in the analog hardware $A \rightarrow A+WW^T$ using the outer products (rank-1 updates)

It is to be appreciated that blocks 520 and 590 relate to sketching on an analog crossbar array.

A description will now be given regarding streaming for PCA, in accordance with an embodiment of the present invention.

FIG. 6 is a table showing computational complexities 600 of various evolving data based methods including randomized PCA in accordance with the present invention.

The following definitions apply: nnz(A) is the number of nonzeros in the matrix (~1B); n is the size for SNPs (~1M); k is the desired rank (~100); q is the degree (~5); and p is the update rank.

A factor of O(nnz(A)) speed up is obtained at each update, for both data in-memory and evolving data, with an additional improvement of O(n) for Evolving data.

FIG. 7 is a table showing computational complexities 700 of various streaming data based methods including analog streaming in accordance with the present invention.

The following definitions apply: n is the number of samples (~1M), d is the number of features (1000), and s is the sketching dimension (~100).

A factor of O(n) speed up is obtained over digital streaming PCA.

A description will now be given regarding various further applications to which a dataset having reducing dimensionality due to the present invention can be applied, in accordance with various embodiments of the present invention.

In population genetics, PCA is used to identify dominant gene sequences called the eigengenes such that we can represent all gene sequence in terms of just a few eigengenes (principal components). This process is called tagging SNPs (Single Nucleotide Polymorphisms). A number of image and video processing applications involve PCA as a core component, e.g., in face recognition we use only the PCs to project the new faces/images for recognition, in video background subtraction, we can use the PCs to obtain the background and subtract them from the original video to get the foreground/activities.

A variant of principal components analysis is used in neuroscience to identify the specific properties of a stimulus that increase a neuron's probability of generating an action potential. This technique is known as spike-triggered covariance analysis.

Other applications involving evolving data include structure from motion and recommender systems. These and other applications to which the present invention can be applied are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
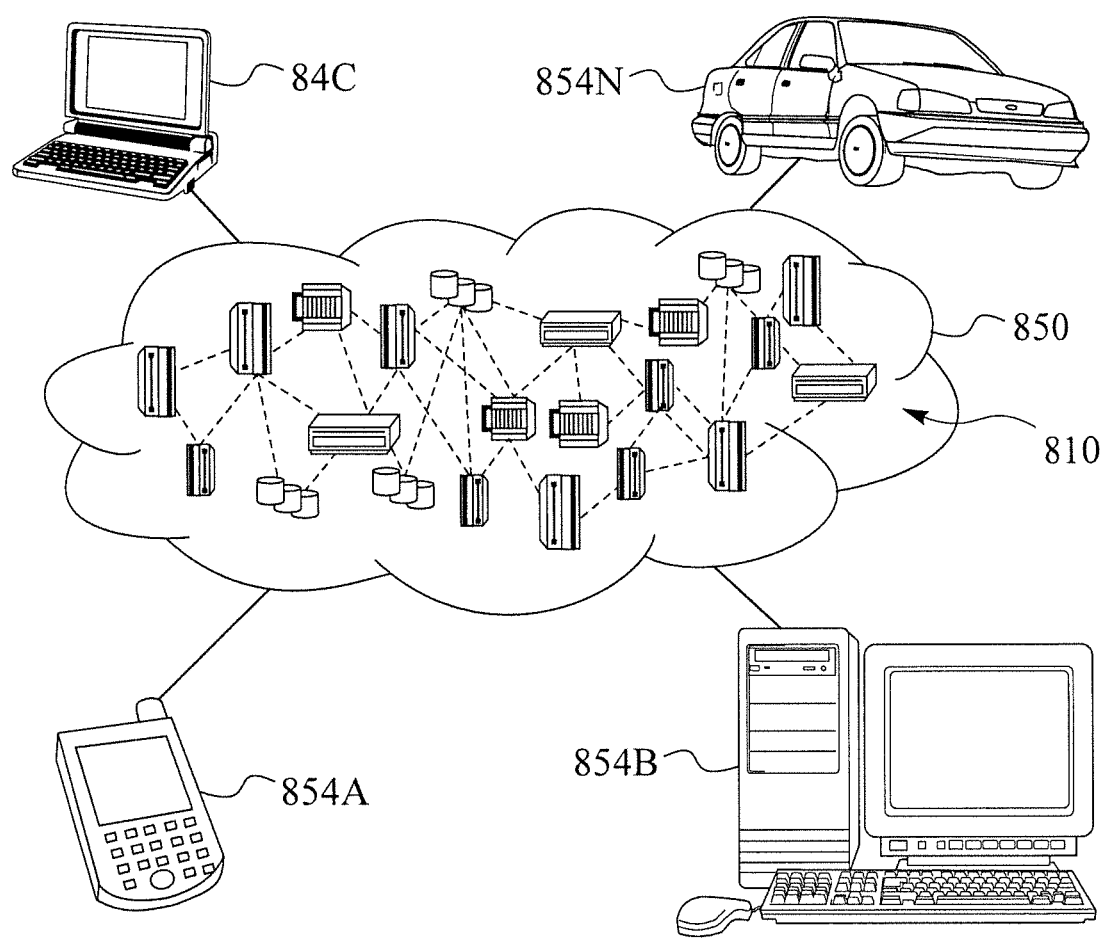
FIG. 8 is a block diagram showing an illustrative cloud computing environment having one or more cloud computing nodes with which local computing devices used by cloud consumers communicate in accordance with one embodiment.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 8854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
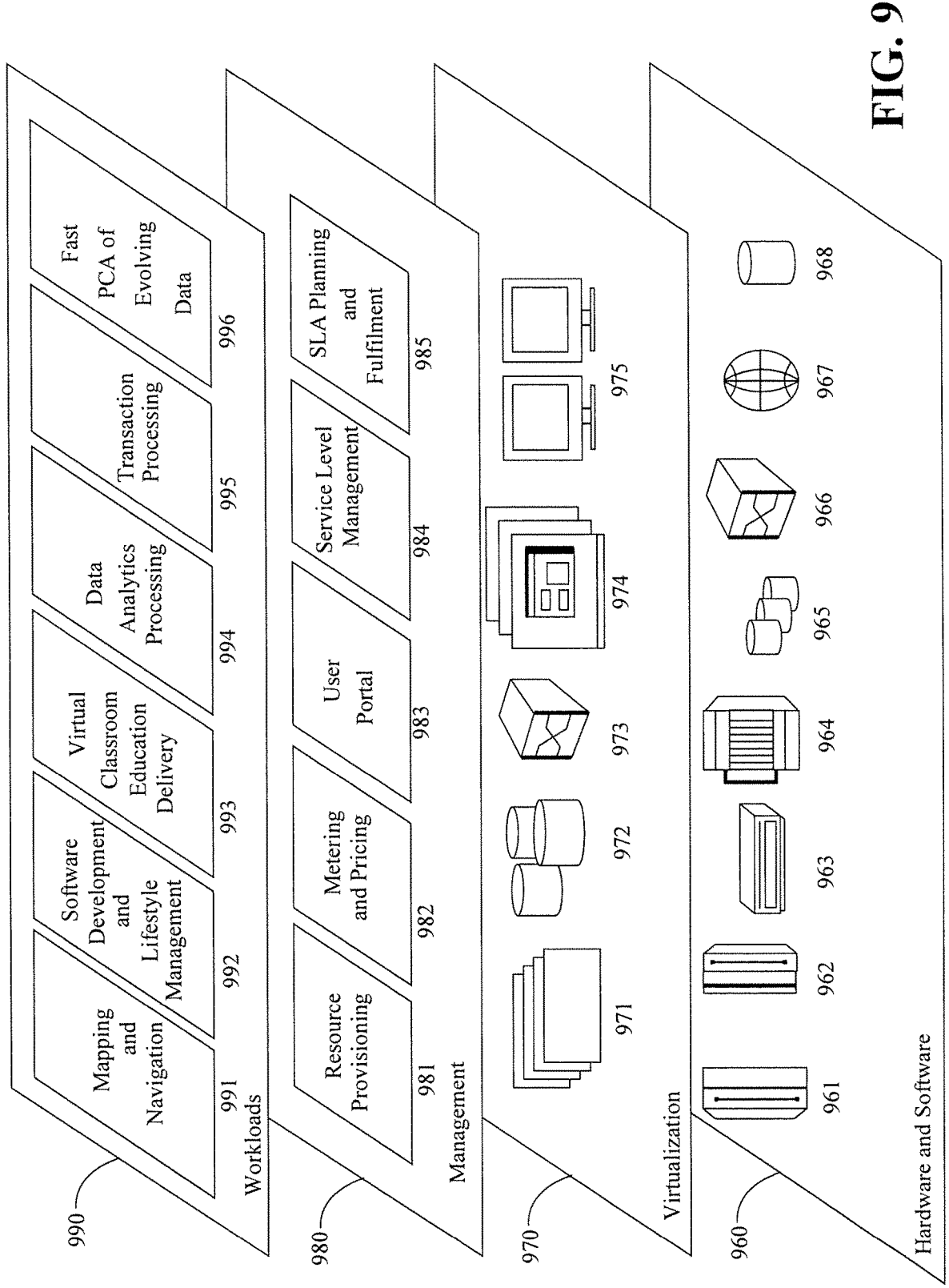
FIG. 9 is a block diagram showing a set of functional abstraction layers provided by a cloud computing environment in accordance with one embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 1184 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and fast PCA of evolving data using analog crossbar hardware 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for performing Principal Component Analysis (PCA) of evolving data, comprising:
   receiving, by a computing device, the evolving data for visualization;
   performing the PCA on an analog crossbar hardware by:
      loading the evolving data onto the analog crossbar hardware,
      performing random sketching to obtain one or more sketch matrices in an analog space by computing matrix vector products with the analog crossbar hardware, and
   performing one or more operations based on the one or more sketch matrices on digital hardware to reduce the evolving data to obtain reduced dimensionality evolving data; and
   using the reduced dimensionality evolving data for a further application.

2. The method of claim 1, wherein said receiving step further comprises receiving updates to the evolving data, and wherein performing the PCA further comprises updating the evolving data using an output product update technique applied to the analog crossbar hardware.

3. The method of claim 2, wherein said updating step is performed in O(1) time using outer products of the outer product update technique.

4. The method of claim 2, wherein said updating step updates the evolving data with rank-1 updates.

5. The method of claim 1, wherein the further application is selected from the group consisting of at least one of population genetics, cosmology, climate science, and bioscience.

6. The method of claim 1, wherein performing the PCA further comprises obtaining estimated principal components of the evolving data using the one or more sketched matrices.

7. The method of claim 6, wherein the estimated principal components are obtained using singular value decomposition.

8. The method of claim 7, wherein the singular value decomposition also yields singular values of the evolving data.

9. The method of claim 8, wherein the singular values of the evolving data define a separability of its principal components.

10. The method of claim 8, wherein the singular values of the evolving data define a strength or energy of information in a direction of a corresponding principal component.

11. The method of claim 6, wherein the sketched matrices are of a smaller size than a matrix of the evolving data, and wherein the estimated principal components are within a ($1\pm\varepsilon$) multiplicative factor of exact principal components of the evolving data with respect to at least any of spectral and Frobenius norms.

12. The method of claim 1, wherein performing the PCA further comprises projecting sketched points in an analog space.

13. The method of claim 1, wherein the analog crossbar hardware comprises an array of Resistive Processing Units (RPUs).

14. A computer program product for performing Principal Component Analysis (PCA) on evolving data, the computer program product comprising a non-transitory computer readable storage medium having program instructions embodied therewith, the program instructions executable by a computer to cause the computer to perform a method comprising:
- receiving, by a computing device, the evolving data for visualization;
- performing the PCA on an analog crossbar hardware by:
  - loading the evolving data onto the analog crossbar hardware,
  - performing random sketching to obtain one or more sketch matrices in an analog space by computing matrix vector products with the analog crossbar hardware, and
  - performing one or more operations based on the one or more sketch matrices on digital hardware to reduce the evolving data to obtain reduced dimensionality evolving data; and
- using the reduced dimensionality evolving data for a further application.

15. The computer program product of claim 14, wherein said receiving step further comprises receiving updates to the evolving data, and wherein performing the PCA further comprises updating the evolving data using an output product update technique applied to the analog crossbar hardware.

16. The computer program product of claim 15, wherein said updating step is performed in O(1) time using outer products of the outer product update technique.

17. The computer program product of claim 15, wherein said updating step updates the evolving data with rank-1 updates.

18. The computer program product of claim 14, wherein the further application is selected from the group consisting of at least one of population genetics, cosmology, climate science, and bioscience.

19. The computer program product of claim 14, wherein performing the PCA further comprises obtaining estimated principal components of the evolving data using the one or more sketched matrices.

20. The computer program product of claim 19, wherein the estimated principal components are obtained using singular value decomposition.

21. The computer program product of claim 19, wherein the sketched matrices are of a smaller size than a matrix of the evolving data, and wherein the estimated principal components are within a ($1\pm\varepsilon$) multiplicative factor of exact principal components of the evolving data with respect to at least any of spectral and Frobenius norms.

22. A system for performing Principal Component Analysis, comprising:
- a Resistive Processing Unit (RPU) crossbar array configured to store a matrix of evolving data for visualization; and
- a processor device for performing the PCA on the RPU crossbar array by:
  - loading the evolving data onto the RPU crossbar array,
  - performing random sketching to obtain one or more sketch matrices in an analog space by computing matrix vector products with the analog crossbar hardware, and
  - performing one or more operations based on the one or more sketch matrices on digital hardware to reduce the evolving data to obtain reduced dimensionality evolving data,
- wherein the processor device uses the reduced dimensionality evolving data for a further application.

23. The system of claim 22, wherein said receiving step further comprises receiving updates to the evolving data, and wherein performing the PCA further comprises updating the evolving data using an output product update technique applied to the RPU crossbar array.

* * * * *